(12) United States Patent
Zhang

(10) Patent No.: US 11,568,899 B2
(45) Date of Patent: *Jan. 31, 2023

(54) METHOD, APPARATUS AND SMART MOBILE TERMINAL FOR EDITING VIDEO

(71) Applicant: BEIJING DAJIA INTERNET INFORMATION TECHNOLOGY CO., LTD., Beijing (CN)

(72) Inventor: Qi Zhang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 9 days.

This patent is subject to a terminal disclaimer.

(21) Appl. No.: 17/381,842

(22) Filed: Jul. 21, 2021

(65) Prior Publication Data
US 2021/0350831 A1    Nov. 11, 2021

Related U.S. Application Data

(63) Continuation of application No. 16/906,761, filed on Jun. 19, 2020, now Pat. No. 11,100,955, which is a
(Continued)

(30) Foreign Application Priority Data

Dec. 20, 2017  (CN) .......................... 201711386533.8

(51) Int. Cl.
  *G11B 27/036* (2006.01)
  *G11B 27/34* (2006.01)

(52) U.S. Cl.
  CPC ............ *G11B 27/036* (2013.01); *G11B 27/34* (2013.01)

(58) Field of Classification Search
  CPC .... G11B 27/036; G11B 27/34; H04N 21/431; H04N 21/44012; H04N 21/47217; H04N 21/4858; H04N 21/8456
(Continued)

(56) References Cited

U.S. PATENT DOCUMENTS 9,836,484 B1 * 12/2017 Bialynicka-Birula ...................... H04N 5/23219
2002/0191957 A1 * 12/2002 Ito ........................ G11B 27/034
  386/288

(Continued)

FOREIGN PATENT DOCUMENTS

| CN | 102638658 A | 8/2012 |
| CN | 104093090 A | 10/2014 |

(Continued)

OTHER PUBLICATIONS

Youku "Xiaomi Mobile Phone Tips Make You Easily Become a Video Editing Master", Oct. 9, 2017.

*Primary Examiner* — Thai Q Tran
*Assistant Examiner* — Stephen R Smith
(74) *Attorney, Agent, or Firm* — Meunier Carlin & Curfman LLC

(57) ABSTRACT

Disclosed are a method, an apparatus and a smart mobile terminal for editing a video. The method includes: acquiring an editing instruction to be executed of a user; selecting frame images which indicate a duration of a video segment in a preset showing area based on the editing instruction; storing the video segment in a preset second storage area; storing a reserved video segment in a preset first storage area; rendering the frame images by invoking a preset rendering script for highlighting the frame images in the showing area; retrieving frames of the reserved video segment sequentially based on a preset first time span; determining scaled frames based on a preset scaling proportion and the frames; and arranging the scaled frames in the showing area sequentially in an order of retrieving for displaying frame images which indicates a duration of the reserved video segment in the showing area.

17 Claims, 5 Drawing Sheets

Related U.S. Application Data continuation of application No. PCT/CN2018/115916, filed on Nov. 16, 2018.

(58) Field of Classification Search
USPC ......... 386/241, 278–290, 224, 230; 715/203, 715/719–726
See application file for complete search history.

(56) References Cited

U.S. PATENT DOCUMENTS

| | | | |
|---|---|---|---|
| 2011/0019974 A1* | 1/2011 | Konoshima | H04N 21/2401 386/284 |
| 2014/0086560 A1* | 3/2014 | Gallo | G11B 27/34 386/278 |
| 2014/0310598 A1* | 10/2014 | Sprague | G06F 16/40 715/716 |
| 2016/0165284 A1* | 6/2016 | Bargagni | H04N 21/41407 725/12 |
| 2016/0225408 A1* | 8/2016 | Khan | H04N 5/772 |
| 2017/0180780 A1* | 6/2017 | Jeffries | H04N 21/4307 |
| 2018/0332354 A1* | 11/2018 | Boniface | H04N 21/4788 |
| 2020/0066305 A1* | 2/2020 | Spence | H04N 21/8549 |

FOREIGN PATENT DOCUMENTS

| | | |
|---|---|---|
| CN | 104836963 A | 8/2015 |
| CN | 107295416 A | 10/2017 |
| CN | 108040288 A | 5/2018 |

* cited by examiner

METHOD, APPARATUS AND SMART MOBILE TERMINAL FOR EDITING VIDEO

This application is a continuation of U.S. patent application Ser. No. 16/906,761, filed on Jun. 19, 2020, which is a continuation of International Application No. PCT/CN2018/115916, filed on Nov. 16, 2018, which is based on and claims the priority under 35 U.S.C 119 to Chinese Patent Application No. 201711386533.8, filed on Dec. 20, 2017 in the China National Intellectual Property Administration. The disclosure of the above application is incorporated herein by reference in their entireties.

FIELD OF INVENTION

The embodiments of the present application relate to the field of video processing, and in particular, to a method, an apparatus and a smart mobile terminal for editing a video.

BACKGROUND

The video editing refers to the editing process of firstly recording the expected images with a video camera and then using a software for editing the video to make the recorded images into a disc on a computer. Currently, as the processing capability of the smart mobile terminal is getting better and better, the editing of the taken video through the smart mobile terminal has become a new demand for video editing.

BRIEF SUMMARY

The embodiments of the present application provide a method, an apparatus and a smart mobile terminal for editing a video that indicate the original video duration through a showing area and can display the duration of a video to be edited in the display area.

According to an embodiment of the disclosure, the disclosure provides a method for editing a video, including:
  acquiring an editing instruction to be executed of a user;
  selecting frame images which indicate a duration of a video segment in a preset showing area based on the editing instruction, where the video segment is the video segment to be edit; and rendering the frame images by invoking a preset rendering script for highlighting the frame images in the showing area.

According to an embodiment of the disclosure, the method includes:
  selecting at least one frame image section which indicates the duration of the video segment in the preset showing area based on the editing instruction, wherein the video segment is the video segment to be edit; and rendering the at least one frame image section by invoking the preset rendering script for highlighting the at least one frame image section in the showing area.

According to an embodiment of the disclosure, the method further includes:
  storing the video segment in a preset second storage area; and storing a reserved video segment in a preset first storage area.

According to an embodiment of the disclosure, after storing the reserved video segment in the preset first storage area, the method further includes:
  retrieving frames of the reserved video segment sequentially based on a preset first time span;
  determining scaled frames based on a preset scaling proportion and the frames; and arranging the scaled frames in the showing area sequentially in an order of retrieving for displaying frame images which indicate a duration of the reserved video segment in the showing area.

According to an embodiment of the disclosure, after storing the reserved video segment in the preset first storage area, the method further includes:
  acquiring a cancelling instruction;
  extracting the video segment stored in the second storage area in a stack manner based on the cancelling instruction; and inserting the video segment into the first storage area.

According to an embodiment of the disclosure, said inserting the video segment into the first storage area includes:
  acquiring a starting time and the duration of the video segment:
  determining a starting insertion time of the video segment in the reserved video segment based on the starting time; and determining an ending insertion time of the video segment based on the duration.

According to an embodiment of the disclosure, said selecting the frame images which indicate the duration of the video segment in the preset showing area based on the editing instruction includes:
  acquiring a starting position and an ending position in the showing area based on the editing instruction:
  determining a starting frame image based on the starting position, and determining an ending frame image based on the ending position; and determining the duration of the video segment based on a difference value between a starting time and an ending time, where the starting time is determined based on the starting frame image and the ending time is determined based on the ending frame image.

According to an embodiment of the disclosure, after storing the reserved video segment in the preset first storage area, the method further includes:
  acquiring a storing instruction;
  deleting video information in the second storage area; and storing video information in the first storage area into a local storage space based on the storing instruction.

An embodiment of the present application further provides an apparatus for editing a video, which includes:
  an acquisition module, configured to acquire an editing instruction to be executed of a user;
  an execution module, configured to select frame images which indicate a duration of a video segment in a preset showing area based on the editing instruction, where the video segment is video segment to be edited; and a generation module, configured to render the frame images by invoking a preset rendering script for highlighting the frame images in the showing area.

According to an embodiment of the disclosure, the execution module includes a first execution sub-module, and the first execution sub-module is configured to select at least one frame image section which indicates the duration of the video segment in the preset showing area based on the editing instruction; and the generation module includes a first generation sub-module, and the first generation sub-module is configured to render the at least one frame image section by invoking the preset rendering script for highlighting the at least one frame image section in the showing area.

According to an embodiment of the disclosure, the apparatus further includes:
  a first storage module, configured to store the video segment in a preset second storage area; and a second storage module, configured to store a reserved video segment in a preset first storage area.

According to an embodiment of the disclosure, the apparatus further includes:

a first retrieval module, configured to retrieve frames of the reserved video segment sequentially based on a preset first time span;

a first scaling module, configured to determine scaled frames based on a preset scaling proportion and the frames; and a second generation sub-module, configured to arrange the scaled frames in the showing area sequentially in an order of retrieving for displaying frame images which indicate a duration of the reserved video segment in the showing area.

According to an embodiment of the disclosure, the apparatus further includes:

a second acquisition module, configured to acquire a cancelling instruction;

a second retrieval module, configured to extract the video segment stored in the second storage area in a stack manner based on the cancelling instruction; and a third storage module, configured to insert the video segment into the first storage area.

According to an embodiment of the disclosure, the third storage module includes: a third acquisition sub-module, configured to acquire a starting time of the video segment;

a first determining sub-module, configured to determine a starting insertion time of the video segment in the reserved video segment based on the starting time; and determine an ending insertion time of the video segment based on the duration.

According to an embodiment of the disclosure, the acquisition module includes:

a fourth acquisition sub-module, configured to acquire a starting position and an ending position in the showing area based on the editing instruction:

a second execution sub-module, configured to determine a starting frame image based on the starting position, and acquire an ending frame image based on the ending position; and a first calculation sub-module, configured to determine the duration of the video segment based on a difference value between a starting time and an ending time, where the starting time is determined based on the starting frame image and the ending time is determined based on the ending frame image.

According to an embodiment of the disclosure, the apparatus further includes:

a fifth acquisition module, configured to acquire a storing instruction; and a third execution module, configured to delete video information in the second storage area and store video information in the first storage area into a local storage space based on the storing instruction.

An embodiment of the present application further provides an apparatus for editing a video, including:

one or more processors;

a memory; and one or more application programs, where the one or more application programs are stored in the memory and configured to be executed by the one or more processors, and the one or more programs are configured to perform the method for editing the video described above.

An embodiment of the present application further provides a smart mobile terminal, including:

one or more processors;

a memory; and one or more application programs, where the one or more application programs are stored in the memory and configured to be executed by the one or more processors, and the one or more programs are configured to perform the method for editing the video described above.

An embodiment of the present application further provides a computer readable storage medium storing a program for editing the video that implements the steps of any method for editing the video described above when executed by a processor.

An embodiment of the present application further provides a computer program product that enables a computer to implement the steps of any method for editing the video described above when running on the computer.

BRIEF DESCRIPTION OF THE DRAWINGS

In order to illustrate the embodiments of the present application or the technical solutions in the prior art more clearly, the accompanying figures which need to be used in describing the embodiments or the prior art will be introduced below briefly. Obviously the accompanying figures described below are some embodiments of the present application, and other accompanying figures can also be obtained by those ordinary skilled in the art according to these accompanying figures without creative labor.

DETAILED DESCRIPTION OF THE EMBODIMENTS

In order to enable those skilled in the art to better understand the technical solutions of the present application, the technical solutions in the embodiments of the present application will be described clearly and completely with reference to the accompanying drawings in the embodiments of the present application.

Some processes described in the specification and claims of the present application and the above drawings include multiple operations appearing in a particular order, but it should be clearly understood that these operations may not be performed in the order appearing herein or may be performed in parallel. The order numbers of operations such as 101 and 102 are only used to distinguish different operations, and the order number itself does not represent any execution sequence. In addition, these processes may include more or fewer operations, and these operations may be performed sequentially or in parallel. It should be noted that the terms such as "first", "second" and the like herein are used to distinguish different messages, devices, modules, etc., do not represent the sequence, and do not limit "first" and "second" as different types either.

The technical solutions in the embodiments of the present application will be described clearly and completely below in combination with the accompanying drawings in the embodiments of the present application. Obviously the described embodiments are only a part of the embodiments of the present application but not all the embodiments. Based upon the embodiments of the present application, all of other embodiments obtained by those skilled in the art without creative work pertain to the protection scope of the present application.

EMBODIMENTS

Figure 1:
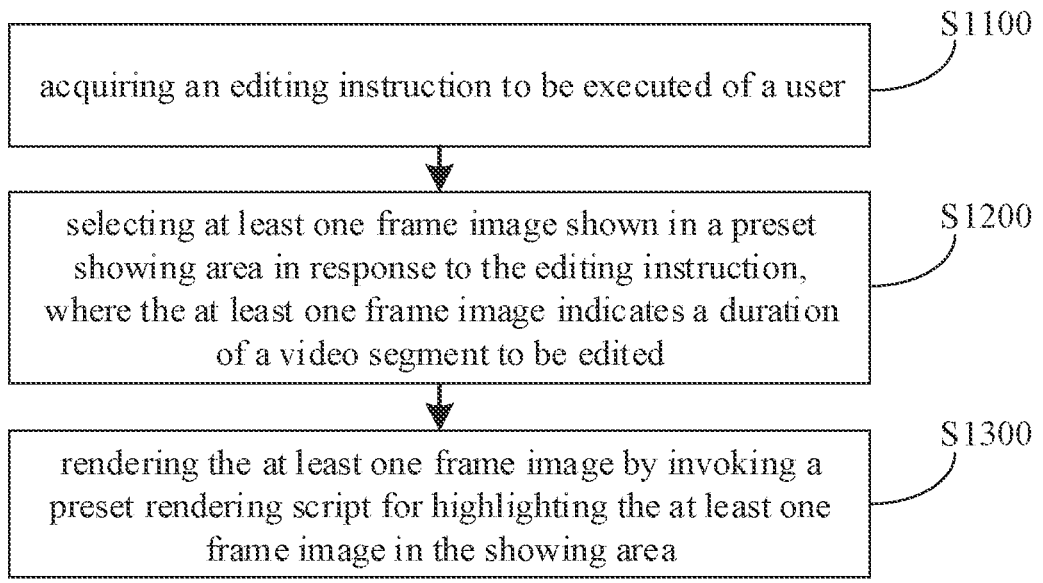
FIG. 1 illustrates a schematic diagram of a basic process of a method for editing a video according to an embodiment of the disclosure.
Figure 2:
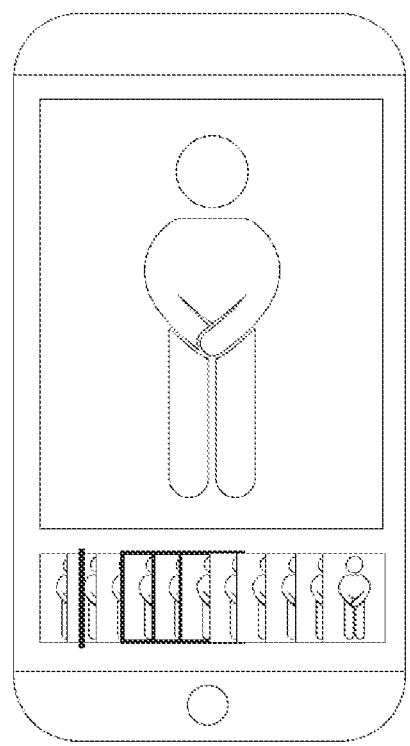
FIG. 2 illustrates a schematic diagram of an edit page according to an embodiment of the disclosure.

Referring to FIGS. 1 and 2. FIG. 1 illustrates a schematic diagram of a basic process of a method for editing a video according to an embodiment of the disclosure; and FIG. 2 illustrates a schematic diagram of a video editing page according to an embodiment of the disclosure.

A method for editing a video according to an embodiment of the disclosure shown in FIG. 1 will be introduced below.

As shown in FIG. 1, a method for editing the video includes the following steps.

S1100: acquiring an editing instruction to be executed of a user.

The user uses a smart mobile terminal to edit the taken or locally stored video. After entering the edit state, the smart mobile terminal receives the clicking or sliding instruction sent by the user via a finger or touch pen to edit the video, so the sliding instruction or clicking instruction of the user is the editing instruction to be executed in the video editing state.

That is to say, after the smart mobile terminal enters the editing state, the display area of the smart mobile terminal may include the video display area and the showing area as shown in FIG. 2. Thus, the user may use a finger or touch pen to trigger the editing instruction to be executed by the clicking or sliding operation on the showing area, so that the smart mobile terminal acquires the editing instruction to be executed of the user after detecting the clicking or sliding operation of the user on the showing area.

Here, the editing instruction to be executed may indicate which frame images among the several video frame pictures displayed in the showing area are the frame images indicating the duration of the video segment to be edited.

S1200: selecting at least one frame image in a preset showing area in response to the editing instruction, where the at least one frame image indicates a duration of a video segment to be edited.

In the video editing state, the display area of the smart mobile terminal includes: a video display area and a showing area. The video display area is used to play the original video or the video to be edited. When the playback is paused, the video display area displays the video frame picture at the moment when the playback progress stops.

As shown in FIG. 2, the showing area displays several frame images. During the video editing, the frame images of the original video are acquired regularly based on a preset time span, and the acquired frame images are displayed in the showing area. For example; the original video length is 36 seconds, one frame image is extracted by a time span of 2 seconds, and the frame images are displayed in the showing area in the extraction order, so each frame image indicates a video picture whose length is 2 seconds. Therefore, the showing area is actually the progress bar of the original video, and the playback position of the original video indicated by the progress pointer can be obtained based on the playback time of the original video corresponding to the frame image corresponding to the position of the progress pointer in the showing area.

Based on the editing instruction of the user. The editing instruction can be the clicking instruction or sliding instruction of the user. One frame image or a plurality of continuous frame images is/are selected in response to the editing instruction sent by the user, and the duration of the video segment to be edited, i.e., the duration of the video to be edited that is selected in response to the editing instruction sent by the user, can be calculated by acquiring the starting time indicated by the starting frame image and the ending time indicated by the ending frame image.

That is to say, after acquiring the editing instruction to be executed of the user, the smart mobile terminal can respond to the editing instruction. Since the editing instruction may indicate some frame images among the several video frame pictures displayed in the showing area, where the some frame images are the frame images indicating the duration of the video segment to be edited, thus the smart mobile terminal can select the frame image indicating the duration of the video segment in the showing area in response to the editing instruction. Then, the duration of the video segment to be edited can be calculated based on the selected starting time indicated by the starting frame image and ending time indicated by the ending frame image. In this way, after acquiring the starting time indicated by the starting frame image and the duration of the video segment to be edited, the smart mobile terminal may determine the corresponding playback time of the video segment to be edited in the original video, and then may acquire the video segment to be edited from the original video based on the determined playback time.

That is to say, by selecting the frame image indicating the duration of the video segment to be edited in the showing area, the video segment to be edited can be determined in the original video based on the corresponding playback time of the selected frame image in the original video.

Here, when the at least one frame image selected indicating the duration of the video segment is multiple frame images, the starting frame image is the first one of the selected multiple frame images, and the ending frame image is the last one of the selected multiple frame images.

When the at least one frame image selected indicating the duration of the video segment is one frame image, the starting frame image and the ending frame image are both the selected frame image. Thus the duration of the video segment to be edited is: the duration indicated by the one frame image.

S1300: rendering the at least one frame image by invoking a preset rendering script for highlighting the at least one frame image in the showing area.

After acquiring the at least one frame image that is selected by the user and indicates the duration of the video segment to be edited, the at least one frame image selected needs to be rendered, so that there is a difference between the rendered frame image and the unrendered frame image, which enables the user to intuitively observe the position and length of the pre-selected video segment to be edited in the original video.

The rendering script is a preset program for rendering the selected frame image, and the rendering mode that can be set by the rendering script is (but not limited to): overlaying a colored semi-transparent mask on the frame image, changing the border color of the frame image, or amplifying the selected frame image for displaying, etc.

In the above embodiments, when editing the video, the duration of the original video is indicated by the showing area in the video editing area; and when the user edits the video, the duration of the corresponding video to be edited can be determined by selecting the corresponding at least one frame image, where the at least one frame image indicates the duration of the video segment to be edited in the showing area. The script rendering is performed on the selected frame image, which makes it distinguishable from other frame images for display; and the selected video segment to be edited is shown intuitively to the user, which facilitates the user to determine the position of the video to be edited. This editing method can increase the utilization rate in the limited space and facilitate the user to browse and operate. That is to say, with the solution provided by the embodiments of the present application, during the video editing process, the at least one frame image indicating the duration of the video segment to be edited is selected in the showing area, and the selected frame image is highlighted, so that the user may determine the content of the video to be edited in the original video intuitively and accurately, thereby reducing the error rate during editing, and enabling the user to edit the video accurately.

It should be noted that the video segment to be edited in the embodiments of the present application can be (but not limited to): a video segment selected by the user to add special effects, a video segment selected by the user to be deleted from the original video, or a video segment selected by the user to be reserved in the original video, etc.

In some embodiments, the user selects a video to be edited in the showing area through a sliding instruction, so the frame images selected by the editing instruction of the user are a plurality of continuous frame images. Specifically, please refer to FIG. 3, which illustrates a flow schematic diagram of another embodiment of a method for editing a video according to the embodiment.

Figure 3:
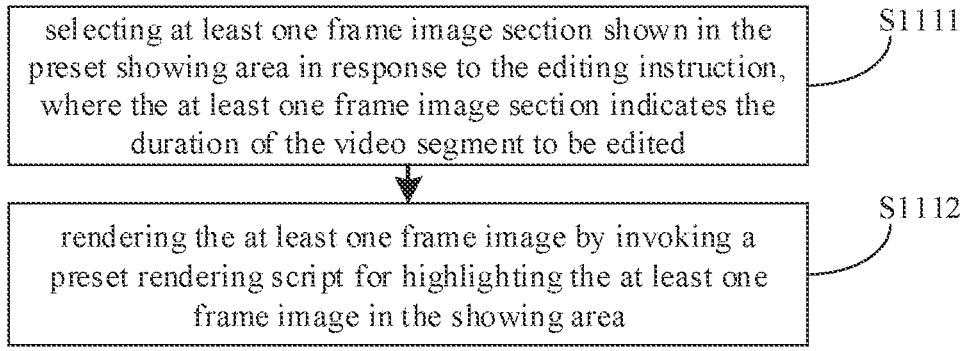
FIG. 3 illustrates a flow schematic diagram of another implementation of a method for editing a video according to an embodiment of the disclosure.

As shown in FIG. 3, after the step S1100, the embodiment may include the following steps.

S1111: selecting at least one frame image section in the preset showing area in response to the editing instruction, where the at least one frame image section indicates the duration of the video segment to be edited.

In this embodiment, a plurality of continuous frame images are selected in response to the sliding instruction of the user, and the duration of the video segment to be edited, i.e., the duration of the video to be edited that is selected according to the editing instruction of the user, can be calculated by acquiring the starting time indicated by the starting frame image and the ending time indicated by the ending frame image.

That is to say, in this embodiment, the editing instruction to be executed of the user that is acquired by the smart mobile terminal is triggered by the user using a finger or a touch pen through the sliding operation on the showing area in the video editing area of the smart mobile terminal.

Here, the user uses the finger or the touch pen to select a frame image shown in the showing area and slide over multiple frame images successively starting from this frame image in the corresponding front-to-back playback order of the frame images in the original video until stopping sliding, and moves the finger or the touch pen away from the display screen of the smart terminal. In this way, the frame images passed during the sliding of the finger of the user or the touch pen in the showing area constitutes at least one frame image section indicating the duration of the video segment to be edited.

Among the multiple frame images slided over by the user, the frame image selected by the user to start sliding is the starting frame image, and when the user stops sliding, the frame image selected by the finger or the touch pen is the ending frame image. Thus, the duration of the video segment to be edited can be calculated according to the starting time indicated by the starting frame image and the ending time indicated by the ending frame image.

Thus, after acquiring the starting time indicated by the starting frame image and the duration of the video segment to be edited, the smart mobile terminal may determine the corresponding playback time of the video segment to be edited in the original video, and then may acquire the video segment to be edited from the original video according to the determined playback time.

For example, each frame image in the showing area indicates a video duration of 2 seconds, the starting time of the original video indicated by the starting frame picture selected by the user is the $6^{th}$ second, and the sliding instruction of the user selects four consecutive frame images, so the duration of the video to be edited is 8 seconds, and the position of the video to be edited in the original video is a video segment of which the starting time is 6 seconds and the ending time is 14 seconds.

S1112; rendering the at least one frame image by invoking a preset rendering script for highlighting the at least one frame image in the showing area.

After acquiring the frame image section that is selected by the user and indicates the duration of the video segment to be edited, the selected frame image section needs to be rendered, so that there is a difference between the rendered frame image section and the unrendered frame image section, which enables the user to intuitively observe the position and length of the pre-selected video segment to be edited in the original video.

The rendering script is a preset program for rendering the selected frame image, and the rendering mode that can be set by the rendering script is (but not limited to): overlaying a colored semi-transparent mask on the frame image, changing the border color of the frame image, or amplifying the selected frame image for displaying, etc.

That is to say, in the embodiment shown in FIG. 3, after the step S1100, the step S1200, in the method for editing the video shown in FIG. 1 described above, of selecting at least one frame image in a preset showing area in response to the editing instruction, where the at least one frame image indicates a duration of a video segment to be edited includes: S1111 of selecting at least one frame image section in the preset showing area in response to the editing instruction, where the at least one frame image section indicates the duration of the video segment; and the step S130) of rendering the at least one frame image by invoking a preset rendering script for highlighting the at least one frame image in the showing area includes: S1112 of rendering the at least one frame image section by invoking the preset rendering script for highlighting the at least one frame image section in the showing area.

It should be noted that the video segment to be edited in the embodiments of the present application can be (but not limited to): a video segment selected by the user to add special effects, a video segment selected by the user to be deleted from the original video, or a video segment selected by the user to be reserved in the original video, etc.

In some embodiments, the video segment to be edited is selected for video cutting, that is, the video segment to be edited will be deleted from the original video. Specifically, please refer to FIG. 4, which illustrates a flow schematic diagram of cutting a video according to the embodiment.

Figure 4:
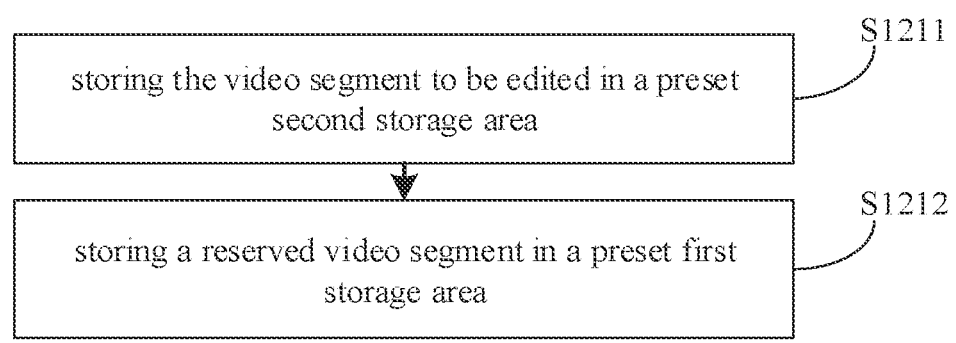
FIG. 4 illustrates a flow schematic diagram of cutting a video according to an embodiment of the disclosure.

As shown in FIG. 4, after the step S1300, the following steps are further included.

S1211: storing the video segment to be edited in a preset second storage area.

In this embodiment, when the video is edited, the video segment to be edited is actually cut, and the video segment to be edited is stored in the preset second storage area after the video segment to be edited is acquired.

After selecting the frame image indicating the duration of the video segment to be edited in the showing area, the smart mobile terminal can determine the video segment to be edited in the original video. Then, the user can send a video cutting instruction to the smart mobile terminal by performing a predetermined operation on the smart mobile terminal, so that the smart mobile terminal stores the video segment to be edited in the preset second storage area after acquiring the video cutting instruction.

For example, the user may trigger the video cutting instruction by clicking on a designated button in the video editing area of the smart mobile terminal; for another example, the user may trigger the video cutting instruction by performing a preset sliding operation in the video editing area of the smart mobile terminal.

The second storage area is the cache area of the smart mobile terminal, i.e., the RAM (Random Access Memory) of the smart mobile terminal. The data information stored in the cache area is cleared when the power is off or according to a preset erasing procedure (for example, when the user chooses not to store the video or closes the application program in the state where the video is not stored), where the data stored in the cache area is completely deleted.

The application program sets a part of the buffer space in the buffer area of the smart mobile terminal as the second storage area, and specifies that the acquired video segment to be edited is stored in the second storage area.

S1212: storing a reserved video segment in a preset first storage area.

In the original video, the video segment to be edited is a cut video segment, and the video segment(s) other than the video segment to be edited is(are) the reserved video segment(s).

When editing a video, the video segment to be edited is actually cut, and the reserved video segment is stored in the preset first storage area.

That is to say, after the above step S1300, the frame image that is not highlighted in the showing area is the frame image indicating the duration of the reserved video segment. According to the correspondence between the frame image in the showing area and the playback time of the original video, the smart mobile terminal can determine the reserved video segment in the original video after determining the video segment to be edited. Then, when the smart mobile terminal stores the video segment to be edited in the preset second storage area, the reserved video segment can be stored in the preset first storage area.

The first storage area is the cache area of the smart mobile terminal, i.e., the RAM of the smart mobile terminal. The data information stored in the cache area is cleared when the power is off or according to a preset erasing procedure (for example, when the user chooses not to store the video or closes the application program in the state where the video is not stored), where the data stored in the cache area is completely deleted.

The application program sets a part of the buffer space in the buffer area of the smart mobile terminal as the first storage area, and specifies that the acquired reserved video segment is stored in the first storage area.

By storing the video segment to be edited and the reserved video segments in different buffer areas respectively, it is convenient to re-splice the reserved video segments.

In some embodiments, after cutting the video to be edited, the reserved video segment needs to be re-displayed, and the content of the showing area needs to be updated.

Figure 5:
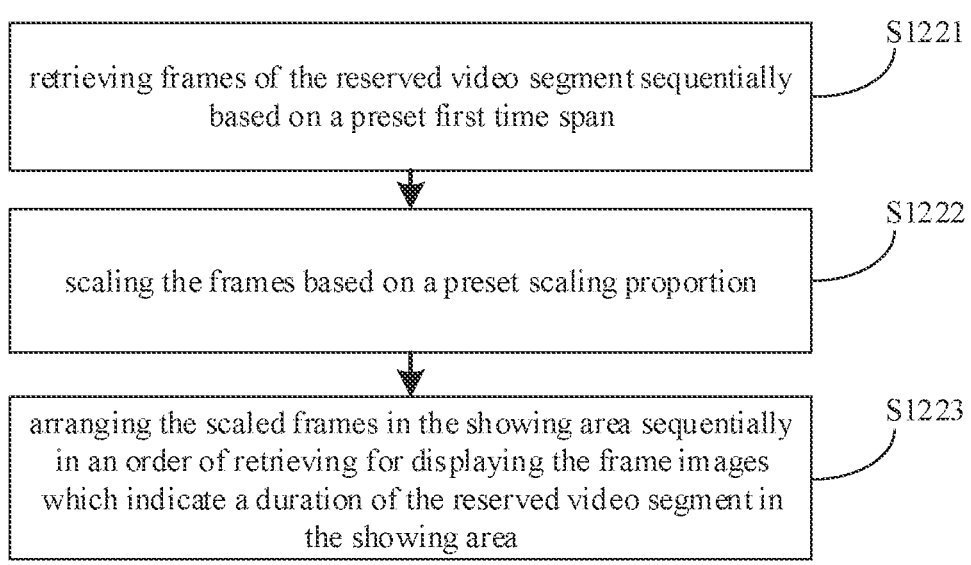
FIG. 5 illustrates a flow schematic diagram of updating the display area according to an embodiment of the disclosure.

Specifically, please refer to FIG. 5, which illustrates a flow schematic diagram of updating the showing area according to the embodiment.

As shown in FIG. 5, after the step S1212, the following steps are further included.

S1221: retrieving frames of the reserved video segment sequentially based on a preset first time span.

The first time span is the time interval for collecting the frame images of the reserved video segment, for example, a frame image of the reserved video segment is acquired every 1.5 seconds. However, the duration of the first time span is not limited to this. Depending on different specific application scenarios, in some embodiments, the duration of the first time span can be longer or shorter, and the selection criterion thereof is limited by the duration of the reserved video, where the longer the duration of the reserved video is, the longer the duration of the first time span is.

The frame images of the reserved video segment are sequentially acquired according to the first time span.

S1222: scaling the frames based on a preset scaling proportion.

The acquired frame images are scaled at the preset proportion according to the preset image processing script, where the scaling proportion needs to be determined according to the size of the container used to show the frame images in the showing area. For example, if the ratio of the container to the frame picture is 1:9, the frame image is reduced nine times.

S1223: arranging the scaled frames in the showing area sequentially in an order of retrieving for displaying the frame images which indicate a duration of the reserved video segment in the showing area.

The update of the showing area is completed by arranging the scaled frame images in the showing area sequentially in the order of retrieving, and at this time, the showing area indicates the progress bar of the duration of the reserved video.

That is to say, after the video segment to be edited is stored in the preset second storage area, the showing area may no longer show the frame image indicating the duration of the video segment to be edited, and at this time, the frame image displayed in the showing area is a frame image indicating the duration of the reserved video segment. Further, there is a correspondence between the frame image displayed in the showing area and the video segment stored in the first storage area, that is, the frame image displayed in the showing area is the frame image indicating the duration of the video segment stored in the first storage area.

Thus, after the reserved video segment is stored in the preset first storage area, the showing area may continue showing the frame image indicating the duration of the reserved video segment, so that the frame image of the original video in the showing area is updated to the frame image indicating the duration of the reserved video segment.

Here, the smart mobile terminal may perform the above steps S1221-S1223 immediately after storing the reserved video segment in the preset first storage area, or receive an area update instruction sent by the user to the smart mobile terminal by performing a predetermined operation on the smart mobile terminal after storing the reserved video segment in the preset first storage area, so that the smart mobile terminal updates the frame image shown in the showing area from the frame image of the original video to the frame image indicating the duration of the reserved video segment after acquiring the area update instruction.

In some embodiments, the user needs to cancel the instruction when the cutting and editing are completed. Specifically, please refer to FIG. 6, which illustrates a flow schematic diagram of cancelling a program according to the embodiment.

Figure 6:
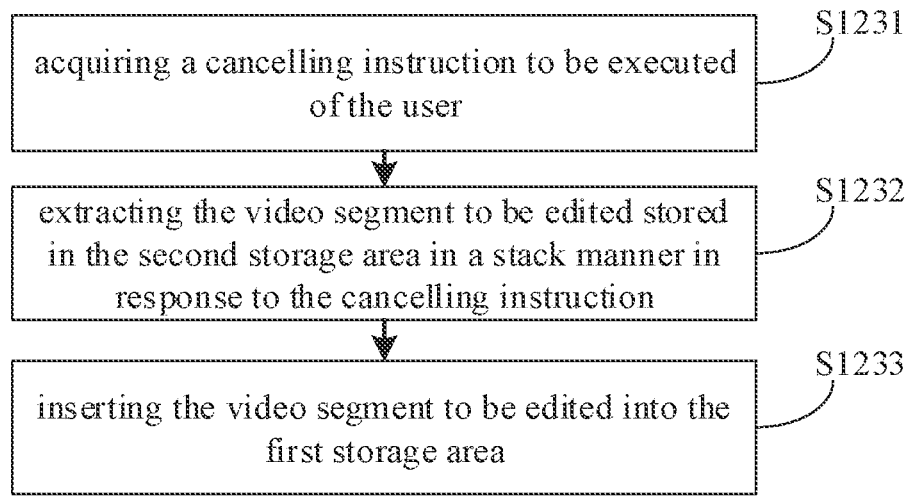
FIG. 6 illustrates a flow schematic diagram of cancelling a program according to an embodiment of the disclosure.

As shown in FIG. 6, after the step S1212, the following steps are further included.

S1231: acquiring a cancelling instruction to be executed of the user.

The smart mobile terminal receives the clicking or sliding instruction sent by the user via the finger or the touch pen to perform the cancelling operation, so the sliding instruction or clicking instruction of the user in the cancelling area is the cancelling instruction to be executed in the video editing state.

That is to say, after storing the video segment to be edited in the preset second storage area, the smart mobile terminal may receive the cancelling instruction to be executed, where the cancelling instruction is triggered by the user using the finger or the touch pen through the clicking or sliding operation on the display screen of the smart mobile terminal. The cancelling instruction to be executed may indicate which video segments to be edited stored in the second storage area are the video segments that need to be cancelled. Here, when the user triggers the cancelling instruction to be executed, the operated area in the display screen may be the video display area or the showing area, which are both reasonable.

S1232: extracting the video segment to be edited stored in the second storage area in a stack manner in response to the cancelling instruction.

When the original video is cut, multiple positions of the original video can be cut, so there may be multiple video segments to be edited in the second storage area. The multiple video segments to be edited enter the second storage area one after another. According to the stack principle, i.e., the first-in-last-out principle, the video segment to be edited that lastly enters the second storage area is firstly removed from the second storage area after the cancelling instruction is received, while the video segment to be edited that firstly enters the second storage area is lastly removed from the second storage area according to the corresponding cancelling instruction.

That is to say, after acquiring the cancelling instruction to be executed of the user, the smart mobile terminal can respond to the cancelling instruction. The cancelling instruction indicates which video segments to be edited stored in the second storage area are the video segments that need to be cancelled, so in response to the cancelling instruction, the smart mobile terminal may extract the video segments to be edited indicated by the cancelling instruction sequentially from the second storage area by starting from the lastly stored video segment to be edited, based on the stack principle and the storage time of each of the video segments to be edited indicated by the cancelling instruction.

S1233: inserting the video segment to be edited into the first storage area.

The video segment to be edited that is extracted from the second storage area is inserted into the corresponding position of the reserved video segment in the first storage area. The steps S1221-S1223 are performed after inserting.

That is to say, after extracting the video segment to be edited that is indicated by the cancelling instruction from the second storage area, the smart mobile terminal can insert the extracted video segment to be edited into the corresponding position of the reserved video segment in the first storage area.

There is a correspondence between the frame image displayed in the showing area and the video segment stored in the first storage area, and the frame image displayed in the showing area is the frame image indicating the duration of the video segment stored in the first storage area. Therefore, after the extracted video segment to be edited is inserted into the first storage area, the frame image displayed by the smart mobile terminal can be updated again, and after the update, it displays: the frame image indicating the duration of the video segment acquired after inserting the video to be edited into the first storage area.

Figure 7:
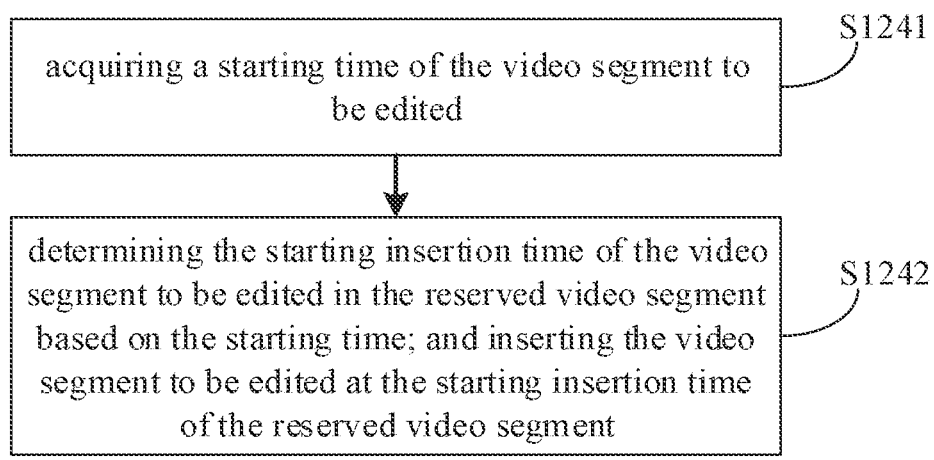
FIG. 7 illustrates a flow schematic diagram of inserting a video segment to be edited into the reserved video segment according to an embodiment of the disclosure.

Please referring to FIG. 7, FIG. 7 illustrates a flow schematic diagram of inserting the video segment to be edited into the reserved video segment according to the embodiment.

As shown in FIG. 7, the step S1233 includes the following steps.

S1241: acquiring a starting time of the video segment to be edited.

After the video segment to be edited is extracted, the starting time of the video segment to be edited, i.e., the moment of the reserved video segment corresponding to the starting picture of the video segment to be edited, is read, for example, the moment of the reserved video segment corresponding to the starting picture of the video to be edited is 5 seconds. In addition, the smart mobile terminal may simultaneously extract the segment duration of the video segment to be edited.

S1242: determining the starting insertion time of the video segment to be edited in the reserved video segment based on the starting time; and inserting the video segment to be edited at the starting insertion time of the reserved video segment.

The insertion position of the video segment to be edited in the reserved video segment is calculated according to the starting time. For example, if the moment of the reserved video segment corresponding to the starting picture of the video to be edited is 5 seconds, the starting insertion time is 5 seconds.

Here, when the smart mobile terminal extracts the segment duration of the video segment to be edited, the smart mobile terminal may further determine the ending insertion time of the video segment to be edited according to the starting insertion time and the segment duration. For example, if the starting insertion time of the video segment to be edited is 5 seconds and the segment duration is 6 seconds, the ending insertion time is 11 seconds.

After determining the starting insertion time, the smart mobile terminal can insert the video segment to be edited at the starting insertion time of the reserved video segment, where the reserved video segment is stored in the first storage area.

When the ending insertion time of the video segment to be edited is determined, the corresponding playback duration between the starting insertion time and the ending insertion time in the reserved video segment is the same as the segment duration of the video segment to be edited.

Figure 8:
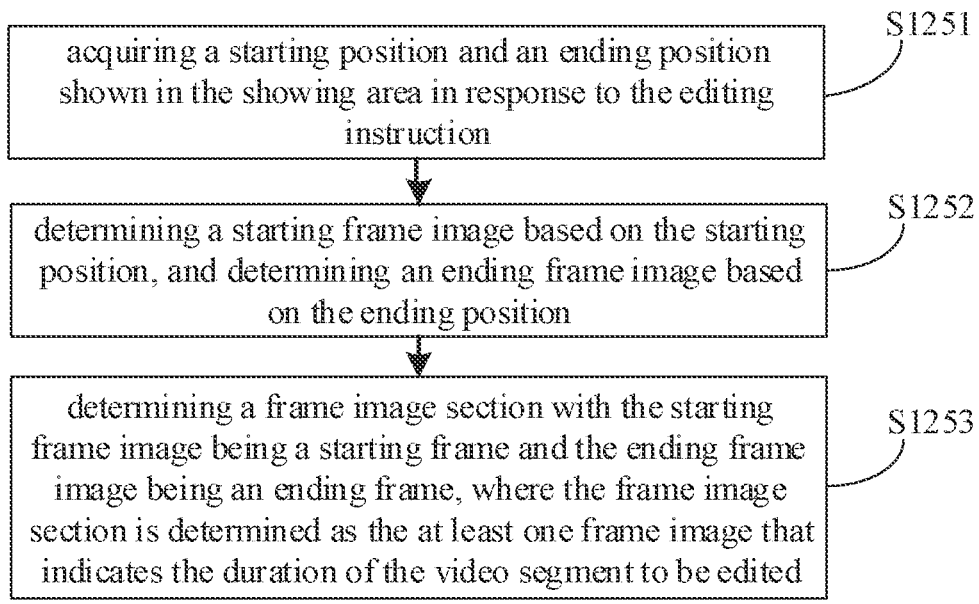
FIG. 8 illustrates a flow schematic diagram of determining the duration of the video segment to be edited according to an embodiment of the disclosure.

Please referring to FIG. 8, FIG. 8 illustrates a flow schematic diagram of determining the duration of the video segment to be edited according to the embodiment.

As shown in FIG. 8, the step S1200 specifically includes the following steps.

S1251: acquiring a starting position and an ending position shown in the showing area in response to the editing instruction.

When the starting coordinate and the ending coordinate in the showing area indicated by the sliding instruction of the user are acquired, the starting position and the ending position in the showing area indicated by the editing instruction can be acquired, where the starting coordinate corresponds to the starting position, and the ending coordinate corresponds to the ending position.

That is to say, in the above step S1251, when the user uses a finger or a touch pen to trigger the editing instruction through the sliding operation on the showing area, the specific operation of sending the editing instruction by the user is: the user starts sliding from one position in the showing area via the finger or the touch pen and stops when sliding to another position. Then, the coordinate of the position where the sliding starts is the starting coordinate of the editing instruction in the showing area, and the coordinate of the position where the sliding stops is the ending coordinate of the editing instruction in the showing area.

S1252: determining a starting frame image based on the starting position, and determining an ending frame image based on the ending position.

The starting frame image is acquired according to the frame image corresponding to the starting position coordinate in the showing area, and the ending frame image is acquired according to the frame image corresponding to the ending position in the showing area.

That is to say, in the above step S1252, when the user uses a finger or a touch pen to trigger the editing instruction through the sliding operation on the showing area, the frame image corresponding to the starting position coordinate in the showing area may be determined as the starting frame image, and the frame image corresponding to the ending position in the showing area may be determined as the ending frame image.

Furthermore, in another implementation, when the user uses a finger or a touch pen to trigger the editing instruction through the clicking operation on the showing area, the specific operation of sending the editing instruction by the user is: the user uses the finger or the touch pen to click on multiple frame images continuously starting from one frame image in the showing area. Then, the first frame image clicked by the user is the starting frame image, and the last frame image clicked by the user is the ending frame image.

S1253: determining a frame image section with the starting frame image being a starting frame and the ending frame image being an ending frame, where the frame image section is determined as the at least one frame image that indicates the duration of the video segment to be edited.

After determining the starting frame image and the ending frame image, the smart mobile terminal can determine the frame image section with the starting frame image being the starting frame and the ending frame image being the ending frame, where the frame image section is determined as the at least one frame image indicating the duration of the video segment to be edited.

Here, after the starting frame image and the ending frame image are determined, the starting time information indicated by the starting frame image and the ending time information indicated by the ending frame image may be acquired, and then the difference between the starting time information and the ending time information may be determined as the duration of the video segment to be edited. In this way, the frame image section with the starting frame image being the starting frame and the ending frame image being the ending frame is determined as the at least one frame image indicating the duration of the video segment to be edited.

For example, the original video length is 36 seconds, one frame image is extracted by a time span of 2 seconds, and the frame images are displayed in the showing area in the extraction order, so the moment indicated by the first frame image is 0 second, the moment indicated by the second frame image is 2 seconds . . . , and so on. The duration of the video segment to be edited can be calculated from the time information difference between the starting frame image and the ending frame image.

In some embodiments, after the user finishes the editing, the reserved video segment needs to be stored. Specifically, please refer to FIG. 9, which illustrates a flow schematic diagram of storing a program according to the embodiment.

Figure 9:
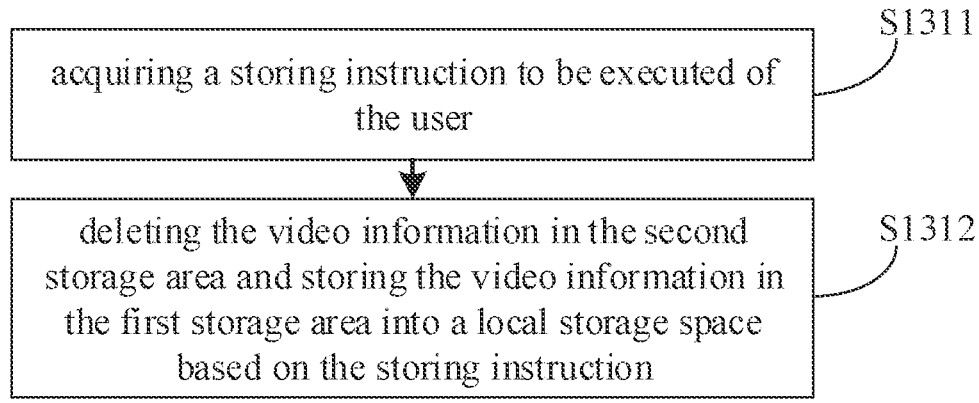
FIG. 9 illustrates a flow schematic diagram of storing a program according to an embodiment of the disclosure.

As shown in FIG. 9, the following steps are included.

S1311: acquiring a storing instruction to be executed of the user.

The smart mobile terminal receives the clicking or sliding instruction sent by the user via the finger or the touch pen to perform the storing operation, so the sliding instruction or clicking instruction of the user in the store area is the storing instruction to be executed in the video editing state.

That is to say, after storing the reserved video segment in the preset first storage area, the smart mobile terminal may receive the storing instruction to be executed which is triggered by the user using the finger or the touch pen through the clicking or sliding operation on the display screen of the smart mobile terminal. The storing instruction to be executed may indicate which storage location of the smart mobile terminal is used to store the reserved video segment stored in the first storage area, and may also indicate which video information in the second storage area is deleted. Here, when the user triggers the storing instruction to be executed, the operated area in the display screen may be the video display area or the showing area, which are both reasonable.

S1312: deleting the video information in the second storage area and storing the video information in the first storage area into a local storage space based on the storing instruction.

That is to say, after acquiring the storing instruction to be executed of the user, the smart mobile terminal can respond to the storing instruction. Since the storing instruction to be executed indicates which storage location of the smart mobile terminal is used to store the reserved video segment stored in the first storage area and which video information in the second storage area is deleted, the smart mobile terminal may, in response to the storing instruction, store the video information in the first storage area into the local storage space according to the position indicated by the storing instruction, and delete the video information in the second storage area according to the video information indicated by the storing instruction.

Since the second storage area and the first storage area are both cache areas, during storing, there is a need to delete the video segment to be edited that is cut in the second storage area, and simultaneously store the reserved video segment in the first storage area into the memory of the smart mobile terminal.

In order to solve the above technical problem, an embodiment of the present application further provides a video editing apparatus. Specifically, please refer to FIG. 10, which illustrates a block diagram of a basic structure of an apparatus for editing the video according to the embodiment.

Figure 10:
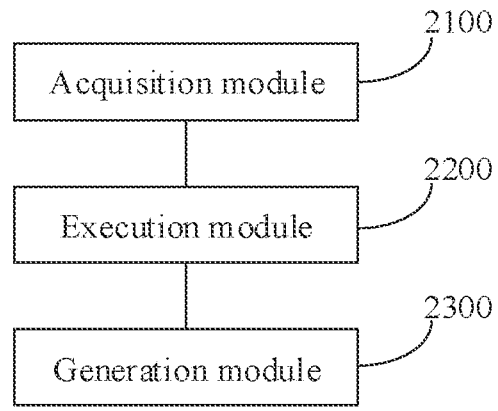
FIG. 10 illustrates a block diagram of a basic structure of an apparatus for editing the video according to an embodiment of the disclosure.

As shown in FIG. 10, the apparatus for editing the video includes an acquisition module 2100, an execution module 2200 and a generation module 2300, where the acquisition module 2100 is configured to acquire an editing instruction to be executed of the user; the execution module 2200 is configured to select frame images which indicate a duration of a video segment in a preset showing area in response to the editing instruction, where the video segment is video segment to be edited; and the generation module 2300 is configured to render the frame images by invoking a preset rendering script for highlighting the frame images in the showing area.

When the video editing apparatus performs the video editing, the duration of the original video is indicated by the showing area in the video editing area, and when the user edits the video, the duration of the corresponding video to be edited can be determined by selecting the corresponding at least one frame image, where the at least one frame image indicates the duration of the video segment to be edited in the showing area. The script rendering is performed on the selected frame image, which makes it distinguishable from other frame images for display; and the selected video segment to be edited is shown intuitively to the user, which facilitates the user to determine the position of the video to be edited. This editing method can increase the utilization rate in the limited space and facilitate the user to browse and operate. That is to say, with the solution provided by the embodiments of the present application, during the video editing process, the at least one frame image indicating the duration of the video segment to be edited is selected in the showing area, and the selected frame image is highlighted, so that the user may determine the content of the video to be edited in the original video intuitively and accurately, thereby reducing the error rate during editing, and enabling the user to edit the video accurately.

In some embodiments, the above execution module 2200 includes a first execution sub-module, and the above generation module 2300 includes a first generation sub-module, where the first execution sub-module is configured to select at least one frame image section which indicates the duration of the video segment in the preset showing area in response to the editing instruction; and the first generation sub-module is configured to render the at least one frame image section by invoking the preset rendering script for highlighting the at least one frame image section in the showing area.

In some embodiments, the video editing apparatus further includes: a first storage module and a second storage module, where the first storage module is configured to store the video segment to be edited in a preset second storage area; and the second storage module is configured to store a reserved video segment in a preset first storage area.

In some embodiments, the video editing apparatus further includes: a first retrieval module, a first scaling module and a second generation module, where the first retrieval module is configured to retrieve frames of the reserved video segment sequentially based on a preset first time span; the first scaling module is configured to determine scaled frames based on a preset scaling proportion and the frames; and the second generation module is configured to arrange the scaled frames in the showing area sequentially in an order of retrieving for displaying frame images which indicate a duration of the reserved video segment in the showing area.

In some embodiments, the video editing apparatus further includes: a second acquisition module, a second retrieval module and a third storage module, where the second acquisition module is configured to acquire a cancelling instruction to be executed of the user; the second retrieval module is configured to extract the video segment to be edited stored in the second storage area in a stack manner in response to the cancelling instruction; and the third storage module is configured to insert the video segment to be edited into the first storage area.

In some embodiments, the above third storage module includes: a third acquisition sub-module and a first determining sub-module, where the third acquisition sub-module is configured to acquire a starting time and the segment duration of the video segment to be edited; the first determining sub-module is configured to determine a starting insertion time of the video segment to be edited in the reserved video segment based on the starting time and determine an ending insertion time of the video segment to be edited based on the duration; and the video insertion sub-module is configured to insert the video segment to be edited from the position corresponding to the starting insertion time to the position corresponding to the ending insertion time in the first storage area.

In some embodiments, the above acquisition module 2100 includes: a fourth acquisition sub-module, a second execution sub-module, and a first calculation sub-module, where the fourth acquisition sub-module is configured to acquire a starting position and an ending position in the showing area in response to the editing instruction, and the second execution sub-module is configured to determine a starting frame image based on the starting position and acquire an ending frame image based on the ending position; where the difference between the starting time information indicated by the starting frame image and the ending time information indicated by the ending frame image is the duration of the video segment to be edited.

In some embodiments, the video editing apparatus further includes: a fifth acquisition module and a third execution module, where the fifth acquisition module is configured to acquire a storing instruction to be executed of the user; and the third execution module is configured to delete the video information in the second storage area and store the video information in the first storage area into a local storage space based on the storing instruction.

This embodiment further provides an apparatus. The apparatus includes one or more processors, a memory and one or more application programs. The one or more application programs are stored in the memory and configured to be executed by the one or more processors, and the one or more programs are configured to perform the method for editing the video described above.

This embodiment further provides a smart mobile terminal. Specifically, please refer to FIG. 11, which illustrates a schematic diagram of a basic structure of a smart mobile terminal according to the embodiment.

It should be noted that in this embodiment, the memory 1520 of the smart mobile terminal stores all the programs used to implement the video editing method in this embodiment, and the processor 1580 can invoke the programs in the memory 1520 to execute all the functions listed in the video editing method described above. Since the functions implemented by the smart mobile terminal have been described in detail in the video editing method in this embodiment, the detailed description thereof will be omitted here.

When the smart mobile terminal performs the video editing, the duration of the original video is indicated by the showing area in the video editing area; and when the user edits the video, the duration of the corresponding video to be edited can be determined by selecting the corresponding at least one frame image, where the at least one frame image indicates the duration of the video segment to be edited in the showing area. The script rendering is performed on the selected frame image, which makes it distinguishable from other frame images for display, and the selected video segment to be edited is shown intuitively to the user, which facilitates the user to determine the position of the video to be edited. This editing method can increase the utilization rate in the limited space and facilitate the user to browse and operate. That is to say, with the solution provided by the embodiments of the present application, during the video editing process, the at least one frame image indicating the duration of the video segment to be edited is selected in the showing area, and the selected frame image is highlighted, so that the user may determine the content of the video to be edited in the original video intuitively and accurately, thereby reducing the error rate during editing, and enabling the user to edit the video accurately.

Figure 11:
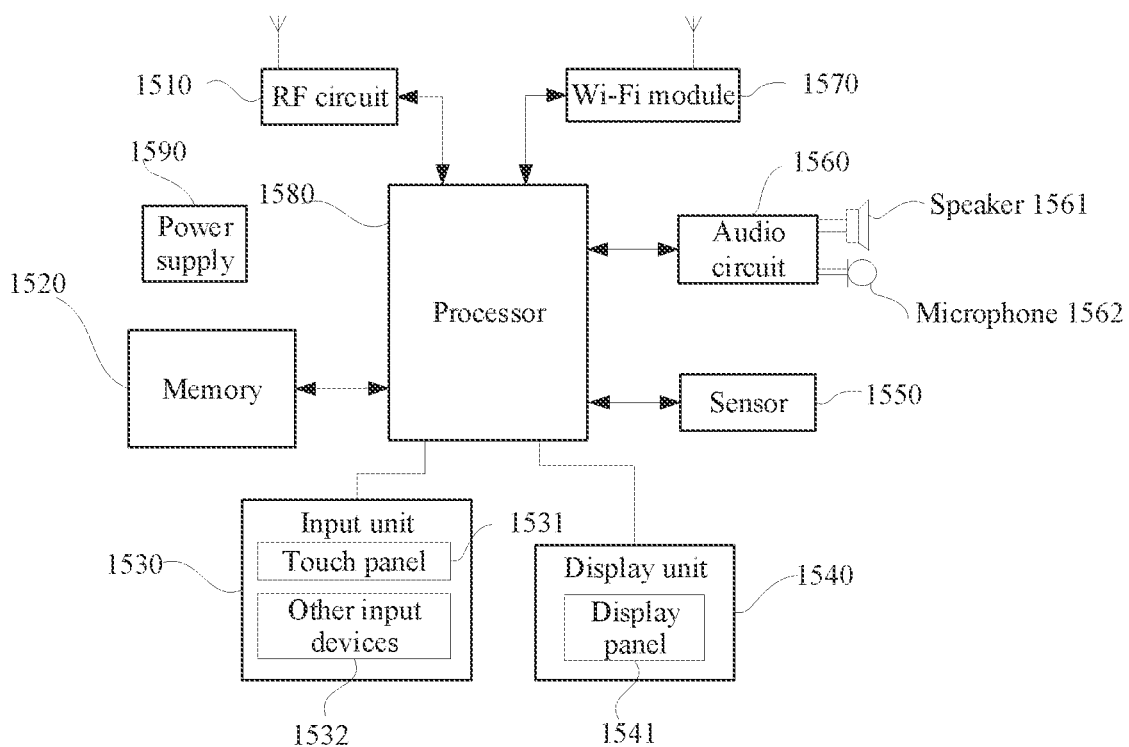
FIG. 11 illustrates a schematic diagram of a basic structure of a smart mobile terminal according to an embodiment of the disclosure.

An embodiment of the present application further provides a smart mobile terminal. As shown in FIG. 11, for ease of description, only parts related to the embodiment of the present application are shown. For specific technical details not disclosed, please refer to the method section of the embodiments of the present application. The terminal may be a smart mobile terminal, a tablet computer, a PDA (Personal Digital Assistant), a POS (Point of Sales), a vehicle-carried computer, or any terminal device. Take the terminal being a smart mobile terminal as an example.

FIG. 11 illustrates a block diagram of a partial structure of a smart mobile terminal related to a terminal according to an embodiment of the disclosure. Referring to FIG. 11, the smart mobile terminal includes: a Radio Frequency (RF) circuit 1510, a memory 1520, an input unit 1530, a display unit 1540, a sensor 1550, an audio circuit 1560, a Wireless Fidelity (Wi-Fi) module 1570, a processor 1580, a power supply 1590 and other components. Those skilled in the art may understand that the structure of the smart mobile terminal shown in FIG. 7 does not constitute a limitation on the smart mobile terminal, and more or fewer components than those illustrated may be included, or certain components may be combined, or different component arrangements may be used.

Various components of the smart mobile terminal will be specifically introduced below with reference to FIG. 11.

The RF circuit 1510 may be used to receive and send signals in the process of receiving and sending the information or in the call process, and particularly, after receiving the downlink information of the base station, the downlink information is given to the processor 1580 for processing; and in addition, send the designed uplink data to the base station. Generally, the RF circuit 1510 includes but not limited to an antenna, at least one amplifier, a transceiver, a coupler, a Low Noise Amplifier (LNA), a duplexer, and the like. Furthermore, the RF circuit 1510 may further communicate with networks and other devices through wireless communication. The above wireless communication may use any communication standard or protocol, including but not limited to: Global System of Mobile Communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), etc.

The memory 1520 may be used to store software programs and modules, and the processor 1580 performs various functional applications and data processing of the smart mobile terminal by running the software programs and modules stored in the memory 1520. The memory 1520 may mainly include a program storage area and a data storage area, where the program storage area may store the operating system, the applications required by at least one function (such as voiceprint playback function, image playback function, etc.), and the like, and the data storage area may store the data (such as audio data, phone book, etc.) created according to the use of the smart mobile terminal, and the like. Furthermore, the memory 1520 may include a high speed random access memory, and may further include a non-volatile memory, e.g., at least one magnetic disk storage device, flash memory device, or other volatile solid-state storage device.

The input unit 1530 may be used to receive the input number or character information, and generate the signal input related to the user settings and functional controls of the smart mobile terminal. Specifically, the input unit 1530 may include a touch panel 1531 and other input devices 1532. The touch panel 1531, also called touch screen, may collect the touch operations of the user on or near it (for example, the operations of the user using any suitable object or accessory such as a finger or a touch pen on or near the touch panel 1531), and drive the corresponding connection apparatus according to the preset program. Optionally, the touch panel 1531 may include two parts: a touch detection device and a touch controller, where the touch detection device detects the touch orientation of the user, detects the signal generated from the touch operation, and transmits the signal to the touch controller; and the touch controller receives the touch information from the touch detection device, converts it into the contact coordinates and then sends them to the processor 1580, and can receive and execute the commands sent by the processor 1580. Furthermore, the touch panel 1531 may be implemented in various types, such as resistance type, capacitive type, infrared, surface acoustic wave and others. In addition to the touch panel 1531, the input unit 1530 may further include other input devices 1532. Specifically, other input devices 1532 may include but not limited to one or more of physical keyboard, function key (such as volume control key, switch key, etc.), trackball, mouse, joystick and the like.

The display unit 1540 may be used to display the information input by the user or the information provided to the user and various menus of the smart mobile terminal. The display unit 1540 may include a display panel 1541, and optionally, the display panel 1541 may be configured in the form of Liquid Crystal Display (LCD), Organic Light-Emitting Diode (OLED) or the like. Further, the touch panel 1531 may cover the display panel 1541. When the touch panel 1531 detects a touch operation on or near it, it transmits the touch operation to the processor 1580 to determine the type of touch event, and then the processor 1580 provides the corresponding visual output on the display panel 1541 according to the type of the touch event. In FIG. 7, the touch panel 1531 and the display panel 1541 as two independent components realize the input and output functions of the smart mobile terminal, but in some embodiments, the touch panel 1531 and the display panel 1541 may be integrated to realize the input and output functions of the smart mobile terminal.

The smart mobile terminal may further include at least one sensor 1550, such as a light sensor, a motion sensor, and other sensors. Specifically, the light sensor may include an ambient light sensor and a proximity sensor, where the ambient light sensor may adjust the brightness of the display panel 1541 according to the light and shade of the ambient light, and the proximity sensor may close the display panel 1541 and/or backlight when the smart mobile terminal moves to the ear. As a type of motion sensor, the accelerometer sensor may detect the magnitudes of the accelerations in all directions (generally three axes), may detect the magnitude and direction of the gravity when it is stationary, and may be used to identify the applications of the smart mobile terminal gestures (such as horizontal and vertical screen switching, related games, magnetometer gesture calibration) and identify the related functions by vibration (such as pedometer, tap), etc.; as for the gyroscope, barometer, hygrometer, thermometer, infrared sensor and other sensors that may be configured in the smart mobile terminal, the detailed description thereof will be omitted here.

The audio circuit 1560, the speaker 1561 and the microphone 1562 may provide audio interfaces between the user and the smart mobile terminal. The audio circuit 1560 may convert the received audio data into an electrical signal and transmit it to the speaker 1561, and the speaker 1561 converts it into a voiceprint signal for outputting; and on the other hand, the microphone 1562 converts the collected voiceprint signal into an electrical signal; the audio circuit 1560 receives the electrical signal and converts it into the audio data, and then outputs the audio data to the processor 1580 for processing; and then the processor 1580 sends the processed audio data to for example another smart mobile terminal via the RF circuit 1510, or outputs the processed audio data to the memory 1520 for further processing.

The Wi-Fi belongs to the short-range wireless transmission technology, and the smart mobile terminal may help the user to receive and send the e-mails, browse the web pages, access the streaming media and the like through the Wi-Fi module 1570 which provides the user with the wireless broadband Internet access. Although FIG. 7 shows the Wi-Fi module 1570, it can be understood that it is not a necessary component of the smart mobile terminal, and can be omitted as needed without changing the essential scope of the invention.

The processor 1580 is the control center of the smart mobile terminal, uses various interfaces and lines to connect various parts of the entire smart mobile terminal, and executes various functions and process data of the smart mobile terminal by running or executing the software programs and/or modules stored in memory 1520 and invoking the data stored in memory 1520, so as to monitor the entire smart mobile terminal. Optionally, the processor 1580 may include one or more processing units; preferably, the processor 1580 may integrate an application processor and a modem processor, where the application processor mainly processes the operating system, user interface and application programs, etc., and the modem processor mainly processes the wireless communications. It can be understood that the foregoing modem processor may not be integrated into the processor 1580.

The smart mobile terminal further includes a power supply 1590 (such as a battery) that supplies power to various components. Preferably, the power supply may be logically connected to the processor 1580 through the power management system, so as to realize functions such as charging, discharging, and power management through the power management system.

Although not shown, the smart mobile terminal may further include a camera, a bluetooth module, etc., which will not be repeated here.

An embodiment of the present application further provides a non-transitory computer readable storage medium including instructions, e.g., the memory 1520 including instructions, which may be executed by the processor 1580 of the smart mobile terminal to complete the method. For example, the non-transitory computer readable storage medium may be ROM (Read-Only Memory), RAM, CD-ROM, magnetic tape, floppy disk, optical data storage device or the like.

A non-transitory computer readable storage medium enables the smart mobile terminal to perform the steps of any video editing method described in the present application, when the instructions in the storage medium are executed by a processor of a smart mobile terminal.

Corresponding to the above method embodiments, an embodiment of the present application provides a computer program product, which enables a computer to perform the steps of the video editing method described in any of the above embodiments w % ben running on the computer.

It should be noted that the specification of the present application and its drawings give the preferred embodiments of the present application, but the present application may be implemented in many different forms, and is not limited to the embodiments described in the specification. These embodiments are not intended as additional limitations on the content of the present application, and the purpose of providing these embodiments is to understand the disclosure of the present application more thoroughly and comprehensively. In addition, the above technical features continue to be combined with each other to form various embodiments not listed above, which are regarded to be in the scope of the specification of the present application; further, those ordinary skilled in the art may make the improvements or changes according to the above description, and all these improvements and changes shall fall within the protection scope of the claims appended to the present application.

What is claimed is:

1. A method for editing a video, comprising:
    acquiring an editing instruction of a user;
    selecting a video segment based on the editing instruction in a preset showing area;
    determining a reserved video segment based on the video segment; wherein the reserved video segment is a remaining video in the video other than the video segment;
    storing the reserved video segment in a preset first cache area;
    retrieving frames sequentially from the preset first cache area;
    generating a reserved video in an order of retrieving frames of the reserved video segment; and
    displaying the reserved video segment.

2. The method according to claim 1, further comprising:
    storing the video segment in a preset second cache area.

3. The method according to claim 2, further comprising:
    acquiring a cancelling instruction;
    extracting the video segment stored in the second cache area in a stack manner based on the cancelling instruction; and
    inserting the video segment into the first cache area.

4. The method according to claim 3, wherein said inserting the video segment into the first cache area comprises:
    acquiring a starting time and the duration of the video segment;

determining a starting insertion time of the video segment in the reserved video segment based on the starting time; and
determining an ending insertion time of the video segment based on the duration.

5. The method according to claim 2, further comprising:
acquiring a storing instruction;
deleting video information in the second cache area; and
storing video information in the first cache area into a local storage space based on the storing instruction.

6. The method according to claim 1, wherein said retrieving frames sequentially from the preset first cache area comprises:
retrieving frames sequentially from the preset first cache area based on a preset first time span;
wherein said generating the reserved video comprises:
determining scaled frames based on a preset scaling proportion and the frames; and
generating the reserved video by sorting the scaled frames sequentially in the order of retrieving frames of the reserved video segment.

7. The method according to claim 1, further comprising:
selecting at least one frame image section which indicates a duration of the video segment in the preset showing area based on the editing instruction, wherein the video segment is the video segment to be edit; and
rendering the at least one frame image section by invoking a preset rendering script for highlighting the at least one frame image section in the preset showing area.

8. The method according to claim 1, wherein said selecting the video segment comprises:
acquiring a starting position and an ending position in the preset showing area based on the editing instruction;
determining a starting frame image based on the starting position, and determining an ending frame image based on the ending position; and
determining the duration of the video segment based on a difference value between a starting time and an ending time, wherein the starting time is determined based on the starting frame image and the ending time is determined based on the ending frame image.

9. An apparatus for editing a video, comprising:
one or more processors configured to read and execute programs in a memory to:
acquire an editing instruction of a user;
select a video segment based on the editing instruction in a preset showing area;
determine a reserved video segment based on the video segment; wherein the reserved video segment is a remaining video in the video other than the video segment;
store the reserved video segment in a preset first cache area;
retrieve frames sequentially from the preset first cache area;
generate a reserved video in an order of retrieving frames of the reserved video segment; and
display the reserved video segment.

10. The apparatus according to claim 9, wherein the one or more processors are configured to read and execute the programs in the memory to:
store the video segment in a preset second cache area.

11. The apparatus according to claim 10, wherein the one or more processors are configured to read and execute the programs in the memory to:
acquire a cancelling instruction;
extract the video segment stored in the second cache area in a stack manner based on the cancelling instruction; and
insert the video segment into the first cache area.

12. The apparatus according to claim 11, wherein the one or more processors are configured to read and execute the programs in the memory to:
acquire a starting time and the duration of the video segment;
determine a starting insertion time of the video segment in the reserved video segment based on the starting time; and
determine an ending insertion time of the video segment based on the duration.

13. The apparatus according to claim 10, wherein the one or more processors are configured to read and execute the programs in the memory to:
acquire a storing instruction;
delete video information in the second cache area; and
store video information in the first cache area into a local storage space based on the storing instruction.

14. The apparatus according to claim 9, wherein the one or more processors are configured to read and execute the programs in the memory to:
retrieve frames sequentially from the preset first cache area based on a preset first time span;
wherein the one or more processors are further configured to read and execute the programs in the memory to:
determine scaled frames based on a preset scaling proportion and the frames; and
generate the reserved video by sorting the scaled frames sequentially in the order of retrieving frames of the reserved video segment.

15. The apparatus according to claim 9, wherein the one or more processors are configured to read and execute the programs in the memory to:
select at least one frame image section which indicates a duration of the video segment in the preset showing area based on the editing instruction, wherein the video segment is the video segment to be edit; and
render the at least one frame image section by invoking a preset rendering script for highlighting the at least one frame image section in the preset showing area.

16. The apparatus according to claim 9, wherein the one or more processors are configured to read and execute the programs in the memory to:
acquire a starting position and an ending position in the preset showing area based on the editing instruction;
determine a starting frame image based on the starting position, and determining an ending frame image based on the ending position; and
determine the duration of the video segment based on a difference value between a starting time and an ending time, wherein the starting time is determined based on the starting frame image and the ending time is determined based on the ending frame image.

17. A smart mobile terminal, comprising:
one or more processors;
a memory; and
one or more application programs, wherein the one or more application programs are stored in the memory and configured to be executed by the one or more processors, and the one or more programs are configured to:
acquire an editing instruction of a user;
select a video segment based on the editing instruction in a preset showing area;

determine a reserved video segment based on the video segment; wherein the reserved video segment is a remaining video in the video other than the video segment;

store the reserved video segment in a preset first cache area;

retrieve frames sequentially from the preset first cache area;

generate a reserved video in an order of retrieving frames of the reserved video segment; and display the reserved video segment.

\* \* \* \* \*